United States Patent
Burgess

(10) Patent No.: US 9,597,935 B2
(45) Date of Patent: Mar. 21, 2017

(54) TOWING IMPLEMENT FOR VEHICLE WITH A PASSAGE AND RELATED METHOD

(71) Applicant: J.H. FLETCHER & CO., Huntington, WV (US)

(72) Inventor: Timothy D. Burgess, South Point, OH (US)

(73) Assignee: J.H. Fletcher & Co., Huntington, WV (US)

( * ) Notice: Subject to any disclaimer, the term of this patent is extended or adjusted under 35 U.S.C. 154(b) by 0 days.

(21) Appl. No.: 14/449,243

(22) Filed: Aug. 1, 2014

(65) Prior Publication Data
US 2015/0035255 A1 Feb. 5, 2015

Related U.S. Application Data

(60) Provisional application No. 61/861,143, filed on Aug. 1, 2013.

(51) Int. Cl.
*B60D 1/54* (2006.01)
*E21D 20/00* (2006.01)
*B60D 1/00* (2006.01)

(52) U.S. Cl.
CPC ............ *B60D 1/54* (2013.01); *E21D 20/003* (2013.01); *B60D 2001/008* (2013.01); *B60D 2001/546* (2013.01)

(58) Field of Classification Search
CPC .............................. B60D 1/54; B60D 2001/546
USPC ....................................................... 280/491.1
See application file for complete search history.

(56) References Cited

U.S. PATENT DOCUMENTS

| | | | |
|---|---|---|---|
| 2,995,386 A | 8/1961 | Peterson | |
| 3,704,900 A | 12/1972 | Gerber | |
| 3,751,072 A | 8/1973 | Williams | |
| 4,013,303 A * | 3/1977 | Milner | 280/491.4 |
| 4,509,769 A * | 4/1985 | Weber | 280/491.1 |
| 4,856,805 A | 8/1989 | Davis | |
| 4,978,134 A | 12/1990 | Dahl et al. | |
| 5,346,243 A | 9/1994 | Boeck | |
| 5,516,140 A * | 5/1996 | Hinte | 280/494 |
| 2011/0084466 A1 | 4/2011 | Olsen | |
| 2011/0109062 A1 | 5/2011 | Fincher et al. | |
| 2012/0248737 A1 | 10/2012 | Fincher et al. | |
| 2013/0270791 A1* | 10/2013 | Anderson | 280/163 |

* cited by examiner

*Primary Examiner* — Jacob Knutson
*Assistant Examiner* — Felicia L Brittman
(74) *Attorney, Agent, or Firm* — King & Schickli, PLLC

(57) ABSTRACT

A towing apparatus for use with a vehicle having a passage, such as a walkway through a roof bolter. The apparatus includes a towing implement adapted for spanning the passage in an operative condition and for exposing the passage in a stowed condition. The towing implement may include a first member and a second member adapted for releasably connecting to the first member to provide the towing implement in the operative position and for disconnecting from the first member in the stowed condition

13 Claims, 3 Drawing Sheets

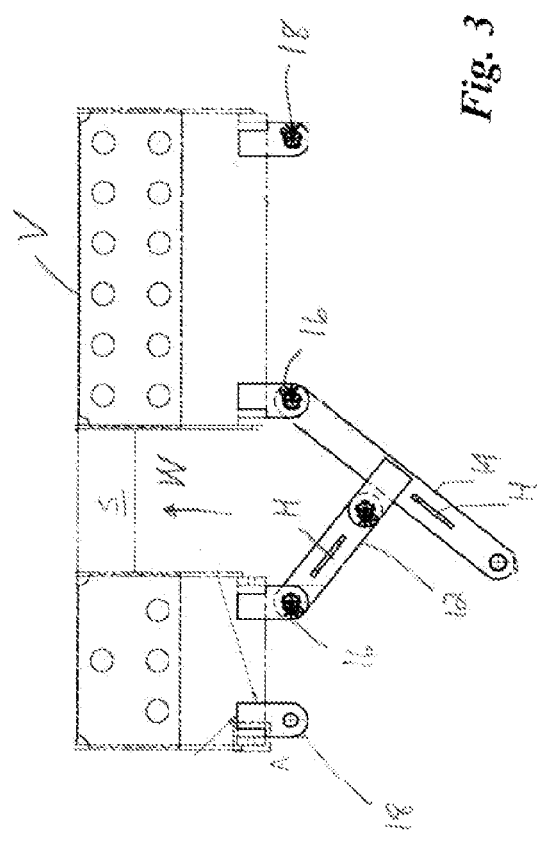
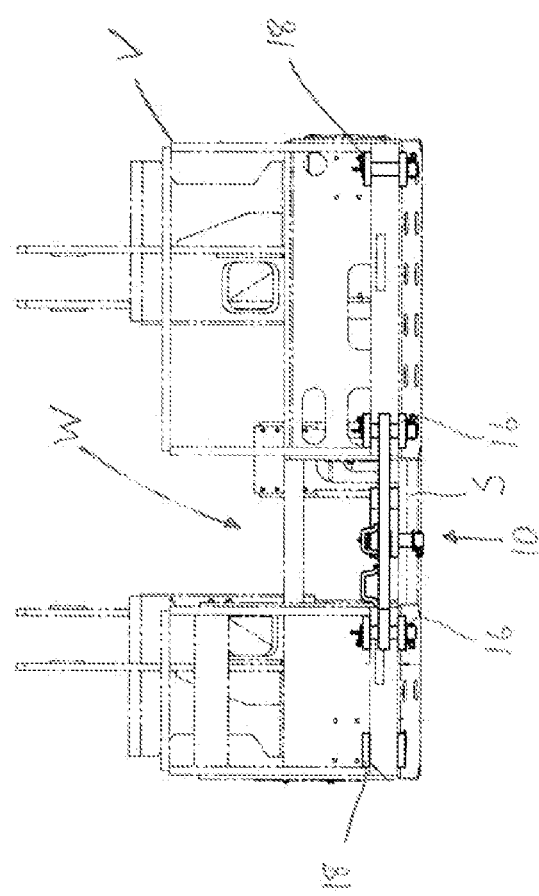

TOWING IMPLEMENT FOR VEHICLE WITH A PASSAGE AND RELATED METHOD

This application claims the benefit of U.S. Provisional Patent Application Ser. No. 61/861,143, filed Aug. 1, 2013, the disclosure of which is incorporated herein by reference.

TECHNICAL FIELD

This disclosure relates generally to the mining and towing arts and, more particularly, to a towing implement or apparatus for a vehicle that includes a passage or opening in the rear, such as a walkway on a roof bolter.

BACKGROUND

Various types of towing apparatuses for use in connection with vehicles are known in the art. A typical example represents a tow bar or hitch that is centrally located at the rear of a vehicle for connecting to a corresponding tongue associated with a towed object, such as for example a trailer. In some applications, such as in a mining vehicle known as a roof bolter, a passage or opening, such as a walkway, may be provided for allowing an operator to step onto and walk along the vehicle. In such a case, the positioning and storing of a typical tow bar assembly is not possible, as it would obstruct the opening.

Accordingly, a need is identified for an improved apparatus for use in connection with a vehicle having passage such that the opening or passage is unobstructed when the towing implement is stored on the vehicle, yet the towing implement is easily accessible and configurable to be used to span the passage of the vehicle for towing purposes.

SUMMARY

One aspect of the disclosure pertains to an apparatus for providing towing capacity to a vehicle having a passage. The apparatus comprises a towing implement adapted for spanning the passage in an operative condition and for exposing the passage in a stowed condition, the towing implement comprising a first member and a second member adapted for releasably connecting to the first member to provide the towing implement in the operative position and for disconnecting from the first member in the stowed condition. At least one retainer is adapted for connecting to the vehicle and retaining each of the first and second members in the stowed condition.

In one embodiment, a first end of each of the members is pivotally mounted to the vehicle adjacent to the passage. A second end of each of the first and second members is adapted to be releasably connected to the vehicle in the stowed condition. One of the first or second members is adapted for connecting to an object to be towed, and the first member may be shorter than the second member. The first and second members may be releasably connected to one another in the operating position via a pinned connection.

In another aspect, the disclosure pertains to an apparatus including a vehicle including a passage and a towing implement adapted for spanning the passage in an operative condition and for exposing the passage in a stowed condition. The towing implement may comprise a first member and a second member adapted for releasably connecting to the first member to provide the towing implement in the operative position and for disconnecting from the first member in the stowed condition.

The vehicle may include at least one retainer for retaining one of the first or second members in the stowed condition. In one embodiment, the vehicle comprises a first retainer for retaining the first member in the stowed condition and a second retainer for retaining the second member in the stowed condition. The first and second members may be substantially parallel to a rear face of the vehicle in the stowed condition.

The passage may comprise a walkway for allowing an operator to walk along the vehicle. The passage may include an opening located adjacent the rear of the vehicle. The opening may be above a step.

Also disclosed is a method of towing an object using a vehicle including a passage. The method comprises providing a towing apparatus spanning the passage in an operative condition and adapted for moving to a stowed condition for exposing the passage in a stowed condition. The providing step may comprise releasably connecting a first member connected to the vehicle to a second member connected to the vehicle to create the operative condition of the towing apparatus.

The step of disconnecting the first member from the second member and moving the first and second members to expose the passage in the stowed condition may also be performed. The first and second members may be mounted by a pivotable connection at one end, and the method may further include the step of pinning an opposite end of the first and second members to the vehicle in the stowed condition. The method may also include the step of connecting the opposite ends of first and second members to a corresponding retainer in the stowed position. The method may further include the step of moving the first and second members to the stowed condition by rotating the first and second members in opposite directions.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings:

FIG. 3 is a top view of the embodiment of FIG. 2; and

FIG. 4 is an end view of the embodiment of FIG. 2.

DETAILED DESCRIPTION

Figure 1:
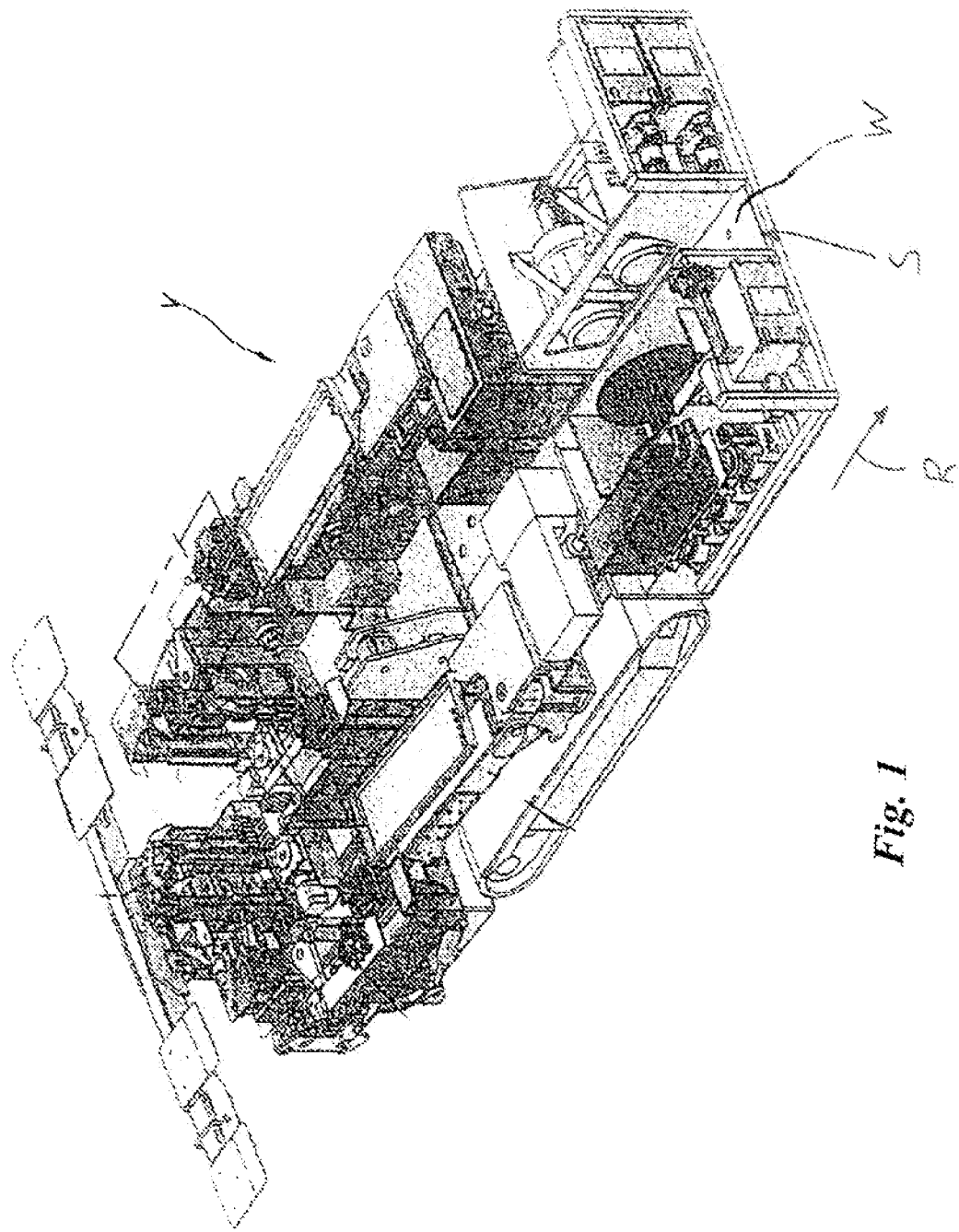
FIG. 1 is a top perspective view of representative vehicle including a passage or opening in the rear of the vehicle forming one aspect of the disclosure.

Reference is now made to FIG. 1, which illustrate a representative vehicle V including a passage, which may take the form of an open-ended walkway W for allowing an operator to embark and disembark from the vehicle, such as along the rear R. An example of one such vehicle to which this invention may have applicability is a mine roof bolter containing a walkway, as may be found in U.S. Patent Application Publication No. 2012/0247836, the disclosure of which is incorporated herein by reference. The junction of the walkway W and the rear of the vehicle V may form a planar surface that serves as a step S on which an operator may step from the ground to access the walkway, and which step is below a preferred height for a towing implement.

In accordance with one aspect of the disclosure, an apparatus 10 is provided on the vehicle V to facilitate towing, either of an object by the vehicle or the vehicle by a different vehicle. The towing apparatus 10 or implement is configured such that it spans the passage, such as above the step S and walkway W in an operating condition (see FIG. 4), but may be withdrawn to a stowed condition such that the passage is unobstructed. This may be done for allowing an operator to step freely onto the vehicle V and traverse the walkway in order to perform various operations, such as in the course of installing roof anchors using bolting rigs associated with the vehicle V in one particular embodiment.

In the illustrated embodiment, the towing implement 10 is formed by first and second members 12, 14 adapted to releasably connect with each other. The connection may be, for example, via a pinned connection. Specifically, and as perhaps best understood with reference to FIG. 2, the first member 12 includes a first end 12a having an aperture, and a second opposite end 12b, also having an aperture. Likewise, the second member 14 includes first and second ends 14a, 14b, as well as a retainer 14c intermediate of the ends. As can be appreciated from FIG. 2, the first member 12 is shorter in length than the second member 14.

Figure 2:
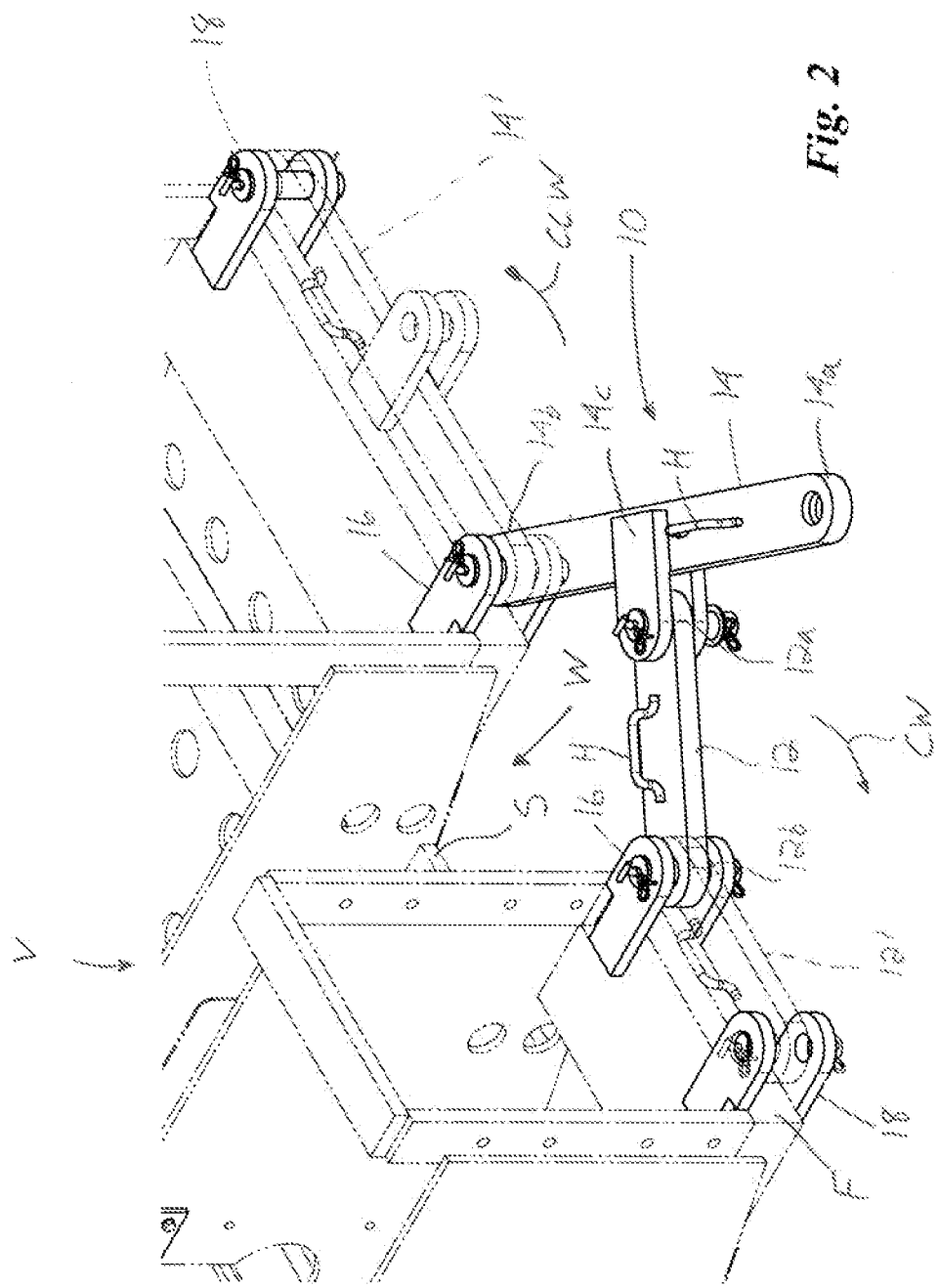
FIG. 2 is perspective view of a towing implement according to the disclosure.

As can perhaps be best understood with reference to FIG. 2, the second ends 12b, 14b of the members 12, 14, may be adapted for connecting to the vehicle V, such as by pinned connection with corresponding retainers 16 (each of which may comprise a pair of spaced, apertured plates) adjacent to the opening formed by the walkway W. In view of the differential lengths, the members 12, 14, when pivoted to span the opening of the passage (walkway W) are arranged such that the first end 12a of the first member 12 engages the retainer 14c of the second member 14, thus forming a Y-shaped structure in plan view (see FIG. 3). By forming a secure, but temporary connection between the two structures, such as by pinning, the apparatus 10 may be created in a manner that allows for towing, such as from the free first end 14a of the second member 14 (which may be provided with a receiver, tow ball, pin, tongue, chain, or like structure adapted for use in providing towing capabilities).

When it is desired to stow the apparatus 10, the first and second members 12, 14 may be disconnected from each other. In view of the pivoting connection established by retainers 16, the members 12, 14 may rotate in opposite directions (clockwise and counterclockwise, respectively; note arrows CW and CCW) to be withdrawn from the opening associated with the passage, such as walkway W, thus allowing for the free and unobstructed movement therethrough (note phantom positions of the members 12' and 14' on opposite sides of the vehicle V in FIG. 2). The rotational movement may continue until the first and second members 12, 14 reach a stowed condition, which as can be seen in FIG. 3 is one substantially parallel to a rear face F of the vehicle V. To facilitate the manual movement of the members 12, 14, handles H may be provided.

In order to restrain the members 12, 14 against undesired movement in the stowed condition, retainers 18 (which may be similar to retainers 18) may be provided for engaging the first or free ends 12a, 14a. The retention may be achieved by way of a pinned connection between aligned and registered apertures in the members 12, 14 and retainers 18. However, clips or like retaining structures could also be used. The important point is that the towing apparatus 10 remains associated with the vehicle V at all times, despite being withdrawn from obstructing the opening of the passage in the stowed condition.

As can be appreciated, modifications are possible while achieving the foregoing objectives. For instance, the members 12, 14 could have the same or a similar length and connect via the ends 12a, 14a, while still providing the desired towing functionality using a pin or the like structure at the junction thus formed. Likewise, the relative positions of the members 12, 14 could be inverted and reversed from what is shown in the drawing figures, such as the first member 12 is on the right hand side and the second member 14 is on the left, while providing the desired functionality.

The foregoing descriptions of various embodiments have been presented for purposes of illustration and description. These descriptions are not intended to be exhaustive or to limit the invention to the precise forms disclosed. For instance, the term "obstruct" the opening covers the condition in which the opening is only partly obstructed, and the towing implement need not be directly positioned within or be adjacent to the opening of the passage in order to "span" it. It is also possible to retract the first and second members 12, 14 from the operative condition as a single structure. The embodiments described provide the best illustration of the inventive principles and their practical applications to thereby enable one of ordinary skill in the art to utilize the invention in various embodiments and with various modifications as are suited to the particular use contemplated.

The invention claimed is:

1. An apparatus, comprising:
a vehicle including a passage comprising a walkway for allowing an operator to walk along the vehicle; and
a towing implement connected to the vehicle in an operative condition, the implement adapted for spanning the passage in the operative condition and for exposing the passage in a stowed condition.

2. The apparatus of claim 1, wherein the towing implement comprises a first member and a second member adapted for releasably connecting to the first member to provide the towing implement in the operative condition and for disconnecting from the first member in the stowed condition.

3. The apparatus of claim 2, wherein the vehicle includes at least one retainer for retaining one of the first or second members in the stowed condition.

4. The apparatus of claim 2, wherein the vehicle comprises a first retainer for retaining the first member in the stowed condition and a second retainer for retaining the second member in the stowed condition.

5. The apparatus of claim 2, wherein the first and second members are substantially parallel to a rear face of the vehicle in the stowed condition, and are located on opposite sides of the vehicle.

6. The apparatus of claim 1, wherein the passage includes an opening located adjacent the rear of the vehicle.

7. The apparatus of claim 1, wherein the vehicle includes a step, and the towing implement is above the step.

8. The apparatus of claim 1, wherein the towing implement remains connected to the vehicle in the stowed condition.

9. A method of towing an object using a vehicle including a passage, comprising:
providing a towing implement spanning the passage in an operative condition and adapted for moving to a stowed condition for exposing the passage,
wherein the providing step comprises releasably connecting a first member connected to the vehicle to a second member connected to the vehicle to create the operative condition of the towing implement.

10. The method of claim 9, further including the step of disconnecting the first member from the second member and moving the first and second members to expose the passage in the stowed condition.

11. The method of claim 9, wherein the first and second members are mounted by a pivotable connection at one end, and further including the step of pinning an opposite end of the first and second members to the vehicle in the stowed condition.

12. The method of claim 9, further including the step of connecting the opposite ends of first and second members to a corresponding retainer in the stowed condition.

13. The method of claim 9, further including the step of moving the first and second members to the stowed condition by rotating the first and second members in opposite directions.

\* \* \* \* \*